(12) United States Patent
Schwarz et al.

(10) Patent No.: US 7,950,229 B2
(45) Date of Patent: May 31, 2011

(54) EXHAUST SYSTEM FOR AN INTERNAL COMBUSTION ENGINE

(75) Inventors: Christian Schwarz, Munich (DE); Hubert Graf, Munich (DE); Werner Verdoorn, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/537,768

(22) Filed: Aug. 7, 2009

(65) Prior Publication Data

US 2010/0031905 A1 Feb. 11, 2010

Related U.S. Application Data

(63) Continuation of application No. PCT/EP2008/000827, filed on Feb. 1, 2008.

(30) Foreign Application Priority Data

Feb. 10, 2007 (DE) .......................... 10 2007 006 699

(51) Int. Cl.
| | |
|---|---|
| *F02B 33/44* | (2006.01) |
| *F02B 37/02* | (2006.01) |
| *F02B 37/04* | (2006.01) |
| *F02B 27/02* | (2006.01) |
| *F02D 23/00* | (2006.01) |
| *F16C 3/06* | (2006.01) |

(52) U.S. Cl. ................. 60/612; 60/602; 60/313
(58) Field of Classification Search ............... 60/602, 60/313, 323, 612; 138/138, 143, 177; 428/457, 428/550; *F02B 37/02, 37/00, 37/007, 37/18, F02B 37/04; F01N 13/08, 13/10*
See application file for complete search history.

(56) References Cited

U.S. PATENT DOCUMENTS

| | | | | |
|---|---|---|---|---|
| 3,524,315 | A | | 8/1970 | Rudert et al. .................... 60/323 |
| 3,718,172 | A | * | 2/1973 | Rice et al. ..................... 138/143 |
| 3,726,084 | A | * | 4/1973 | Meier et al. ..................... 60/313 |
| 3,775,151 | A | * | 11/1973 | Baker et al. ................... 428/457 |
| 4,058,485 | A | * | 11/1977 | Cheung ......................... 428/550 |

(Continued)

FOREIGN PATENT DOCUMENTS

AT 5 00 458 A2 12/2005

(Continued)

OTHER PUBLICATIONS

Kraftfahrtechnisches Taschenbuch, Robert Bosch GmbH Stuttgart, 18th Edition, p. 244.

(Continued)

*Primary Examiner* — Thai Ba Trieu
(74) *Attorney, Agent, or Firm* — Crowell & Moring LLP

(57) ABSTRACT

An exhaust system has first and second exhaust gas turbochargers for a V-8 internal combustion engine having an ignition sequence of a 90° crank angle from one cylinder to the next in each of two cylinder banks. The exhaust system includes a first-through-fourth exhaust lines from the cylinders to the two exhaust gas turbochargers, with two cylinders respectively being assigned to an exhaust line. One exhaust turbocharger is respectively assigned to two exhaust lines. The two cylinders assigned to an exhaust line having an ignition interval of a 360° crank angle. The first and the second exhaust lines assigned to an exhaust gas turbocharger having an ignition sequence displaced with respect to one another by a 180° crank angle. As a result, the opening phase of the charge cycle intake valves can be prolonged, which leads to a significantly higher power of the internal combustion engine.

16 Claims, 1 Drawing Sheet

U.S. PATENT DOCUMENTS

| | | | | |
|---|---|---|---|---|
| 5,463,867 | A | 11/1995 | Ruetz | 60/323 |
| 5,713,200 | A | 2/1998 | Baets et al. | 60/323 |
| 5,816,043 | A * | 10/1998 | Wolf et al. | 60/323 |
| 6,293,311 | B1 * | 9/2001 | Bushi et al. | 138/138 |
| 2004/0091383 | A1 * | 5/2004 | Suzuki et al. | 420/27 |
| 2007/0283938 | A1 | 12/2007 | Augstein et al. | 123/559.1 |
| 2009/0249774 | A1 * | 10/2009 | Sloss et al. | 60/323 |

FOREIGN PATENT DOCUMENTS

| | | | |
|---|---|---|---|
| DE | 5 65 468 | | 12/1932 |
| DE | 1 025 211 | | 2/1954 |
| DE | 1 043 707 | | 12/1954 |
| DE | 1 576 356 | A | 4/1970 |
| DE | 31 38 369 | C1 | 3/1983 |
| DE | 40 30 652 | A1 | 4/1992 |
| DE | 43 42 572 | C1 | 11/1994 |
| DE | 195 39 572 | A1 | 4/1997 |
| DE | 198 26 355 | A1 | 12/1999 |
| DE | 100 15 291 | A1 | 10/2001 |
| DE | 10207077 | A1 * | 2/2003 |
| DE | 10 2004 057 129 | A1 | 6/2006 |
| DE | 10 2006 042 464 | A1 | 3/2008 |
| EP | 639411 | A1 * | 2/1995 |
| EP | 1 662 109 | A1 | 5/2006 |
| EP | 1772602 | A1 * | 4/2007 |
| FR | 696140 | A * | 12/1930 |
| JP | 05149142 | A * | 6/1993 |
| JP | 2005163752 | A * | 6/2005 |
| JP | 2006307677 | A * | 11/2006 |
| JP | 2009191699 | A * | 8/2009 |
| WO | WO 2006/050896 | A1 | 5/2006 |

OTHER PUBLICATIONS

International Search Report dated May 20, 2008 with English translation (six (6) pages).

German Search Report dated Apr. 3, 2008 with English translation (nine (9) pages).

* cited by examiner

EXHAUST SYSTEM FOR AN INTERNAL COMBUSTION ENGINE

CROSS-REFERENCE TO RELATED APPLICATIONS

This application is a continuation of PCT International Application No. PCT/EP2008/000827, filed Feb. 1, 2008, which claims priority under 35 U.S.C. §119 to German Patent Application No. DE 10 2007 006 699.8, filed Feb. 10, 2007, the entire disclosures of which are herein expressly incorporated by reference.

BACKGROUND AND SUMMARY OF THE INVENTION

The invention relates to an internal combustion engine and, more particularly, to an exhaust system having a first and a second exhaust gas turbocharger for an internal combustion engine with eight cylinders in a V-design, a first cylinder bank being formed by a first, a second, a third and a fourth cylinder arranged in series side-by-side, and a second cylinder bank situated opposite the first cylinder bank being formed by a fifth, a sixth, a seventh and an eighth cylinder arranged in series side-by-side.

German published patent application DE 10 2004 057 129 A1 describes a V-engine having 8 cylinders (a V8 engine) with an ignition sequence (or firing order) of a 90° crank angle from one cylinder to the next. Each cylinder bank of the internal combustion engine has four cylinders. Two cylinders respectively of a cylinder bank lead into an exhaust line which, in each case, conducts the exhaust gases of the four assigned cylinders into an exhaust gas turbocharger. The internal combustion engine therefore has two four-flow exhaust lines. Together, the two exhaust lines form an exhaust system. Before entering into the turbochargers, the exhaust lines can be connected with one another in an exhaust-gas-carrying manner. One emission control system respectively is arranged in the exhaust system behind each exhaust gas turbocharger in the flow direction of the exhaust gas.

A disadvantage of the described embodiment is a so-called side-to-side action of the exhaust gases of the four cylinders each leading into an exhaust line, whereby a maximal opening duration of the charge cycle intake valves cannot be implemented.

It is an object of the present invention to provide an exhaust gas system which prevents side-to-side action of the exhaust gases of the four cylinders assigned to an individual exhaust line.

This and other objects are achieved by an exhaust system having a first and a second exhaust gas turbocharger for an internal combustion engine with eight cylinders in a V-design, a first cylinder bank being formed by a first, a second, a third and a fourth cylinder arranged in series side-by-side, and a second cylinder bank situated opposite the first cylinder bank being formed by a fifth, a sixth, a seventh and an eighth cylinder arranged in series side-by-side. The internal combustion engine has an ignition sequence of a 90° crank angle from one cylinder to the next. The exhaust system has a first, a second, a third and a fourth exhaust line from the cylinders to the two exhaust gas turbochargers. Two cylinders are respectively assigned to an exhaust line, and one exhaust turbocharger is respectively assigned to two exhaust lines. The two cylinders assigned to the exhaust line have an ignition interval of a 360° crank angle, and the first and the second exhaust line assigned to the exhaust gas turbocharger have an ignition sequence offset from one another by a 180° crank angle.

As a result of the further development according to the invention, the ignition interval amounts to a 360° crank angle of the two cylinders assigned to an exhaust line or a flow. The turbine wheel of the exhaust gas turbocharger is therefore acted upon by exhaust gases at a 180° ignition interval. By way of this further development, it becomes possible to prolong the opening duration of the charge cycle intake valves in comparison to the state of the art, whereby more power and torque are obtained for the internal combustion engine.

Due to the exhaust system embodiment according to the invention, a better charge exchange is achieved since a symmetrical identical filling with fresh air exists for all eight cylinders. As a result of the symmetrical identical filling, less residual gas remains in the individual cylinders, whereby the knock tendency of the internal combustion engine is significantly improved (knocking is reduced) In addition, fuel consumption is improved, particularly at full load of the internal combustion engine. Furthermore, very high torque values will already exist when the rotational speeds are very low. As a result, the so-called "turbo hole"—a weakening of the torque—in the lower rotational speed range—is almost completely eliminated. Advantageously, the exhaust system according to the invention can be used for internal combustion engines operating according to the spark ignition principle, as well as for internal combustion engines operating according to the Diesel principle.

According to one aspect of the invention, the exhaust system and the two exhaust gas turbochargers are mainly arranged in the V between the cylinder banks. As a result, extremely short paths for the exhaust gas are achieved in the exhaust system. This minimizes flow losses of the exhaust gas and benefits the emissions as well as the fuel consumption.

In a further embodiment of the invention, the first and second turbochargers are twin-scroll turbochargers. This further development is particularly preferred for a two-flow exhaust gas turbocharger, in which case each flow is acted upon by exhaust gas from an exhaust line.

In a further preferred embodiment, the first exhaust gas turbocharger includes a first turbine wheel and the second exhaust gas turbocharger includes a second turbine wheel. The first turbocharger has a third turbine wheel and the second turbocharger has a fourth turbine wheel. Accordingly, each exhaust gas turbocharger has two exhaust gas turbines which each has a separate flow, one exhaust line respectively leading into each flow.

Further preferred embodiments, or manufacturing variants are described herein.

Other objects, advantages and novel features of the present invention will become apparent from the following detailed description of one or more preferred embodiments when considered in conjunction with the accompanying drawings.

DETAILED DESCRIPTION OF THE DRAWING

Figure 1:
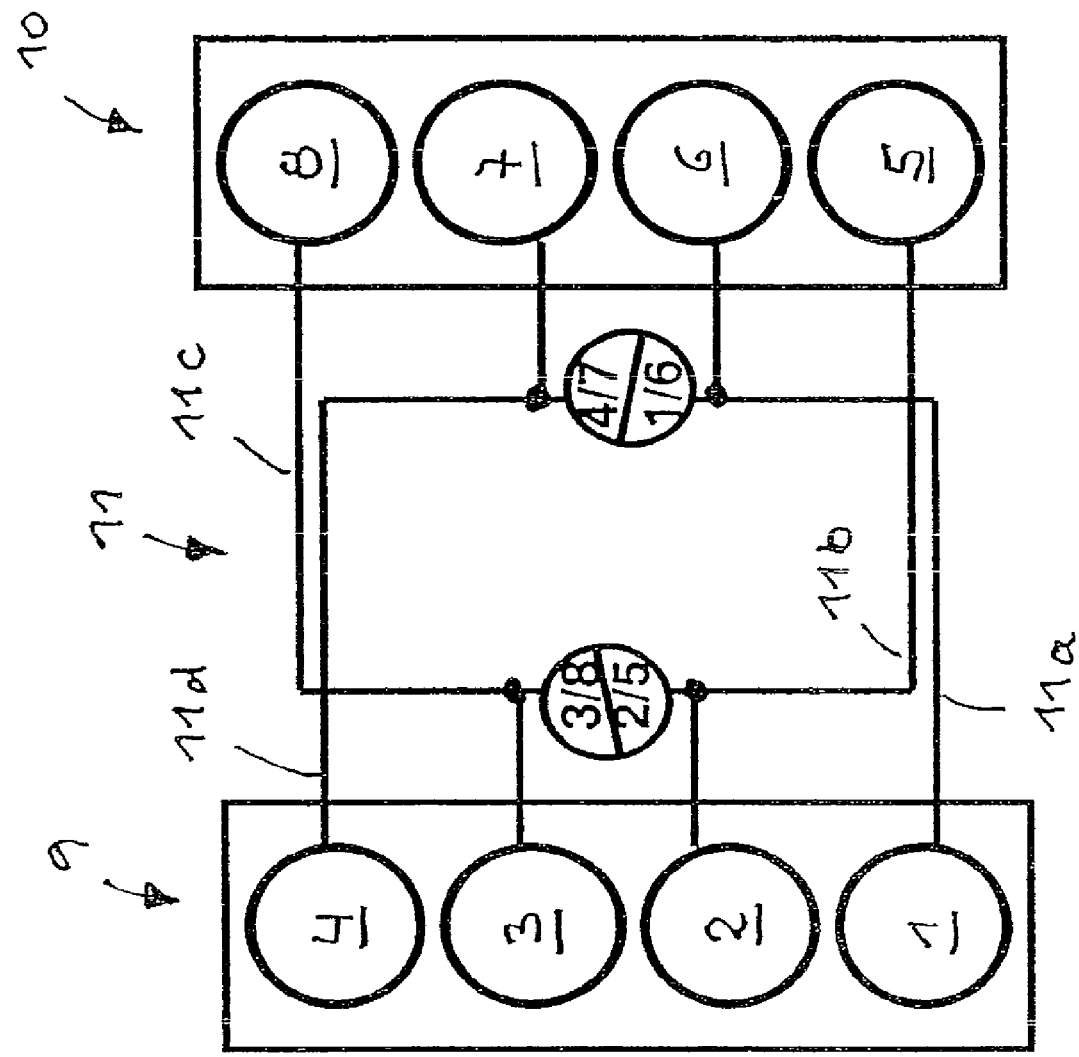
FIG. 1 is a schematic view of an exhaust system according to an embodiment of the invention for an 8-cylinder internal combustion engine having a V-design.

The internal combustion engine has a first cylinder bank 9 and a second cylinder bank 10 situated opposite the first cylinder bank 9. The first cylinder bank 9 has four cylinders 1, 2, 3, 4 arranged in series, and the second cylinder bank 10 also has four cylinders 5, 6, 7, 8 arranged in series. Cylinders 1 and 5, cylinders 2 and 6, cylinders 3 and 7, and cylinders 4 and 8 are arranged opposite one another. An ignition interval from one cylinder to the next nominally amounts to 90°. In practice, however, the ignition interval (firing sequence) may vary from 85° to 95° as a function of the operating condition of the internal combustion engine.

Between the cylinder banks 9 and 10, i.e., in the "V", two exhaust gas turbochargers can be arranged (not shown in detail). The two exhaust gas turbochargers, by way of an exhaust system 11 having the cylinders 1, 2, 3, 4, 5, 6, 7, 8, can be connected with one another in a gas carrying manner. The exhaust system 11 is constructed of a first exhaust line 11a, a second exhaust line 11b, a third exhaust line 11c, as well as a fourth exhaust line 11d. The first exhaust line 11a connects the cylinders 1 and 6 with one another in a exhaust-gas-carrying manner and leads into a first exhaust gas intake (first flow) of a first exhaust gas turbocharger (not shown in detail). The fourth exhaust line 11d connects the cylinders 4 and 7 with one another in an exhaust-gas-carrying manner and leads into a second exhaust gas intake (second flow) of the first exhaust gas turbocharger. The second exhaust line 11b connects the cylinders 2 and 5 with one another in an exhaust-gas-carrying manner and leads into a first exhaust gas intake (third flow) of a second exhaust gas turbocharger (also not shown in detail) The third exhaust line 11c connects the cylinders 3 and 8 with one another in an exhaust-gas-carrying manner and leads into a second exhaust gas intake (fourth flow) of the second exhaust gas turbocharger.

Preferably, each of the first and the second exhaust gas turbochargers is a twin-scroll exhaust gas turbocharger. As an alternative, an exhaust gas turbocharger with two exhaust gas turbines, each having a separate flow, can be used.

In the present embodiment, the exhaust gas turbochargers are arranged in the V between the cylinder banks 9 and 10; however, in another embodiment, the exhaust gas turbochargers may also be arranged on the outside, i.e., in front of, behind, and/or laterally on the internal combustion engine. For reasons of weight, the exhaust system is preferably manufactured as a sheet metal component, again preferably in an air-gap-insulated construction. The exhaust system could also be manufactured as a cast component which, however, would have disadvantages with respect to weight. Correspondingly, a composite construction as a combined sheet metal/cast component could also be used, as well as a liquid-cooled light-metal exhaust system construction. In the latter case, the cooling preferably takes place by way of a coolant of the internal combustion engine, in which case an aluminum alloy is preferably used as the light metal.

The exhaust system may be used for any 8-cylinder internal combustion engine operating as a 4-stroke engine, irrespective of whether it operates according to the spark ignition or the Diesel combustion principle.

As a result of the further development of the exhaust system, each turbine of the exhaust gas turbochargers "sees" an ignition interval of a 180° crank angle. Depending on the operating condition of the internal combustion engine, this ignition interval may vary by ±5°. This is the maximally achievable ignition interval for an internal combustion engine with 8 cylinders. This maximal ignition interval leads to an optimal charge exchange because an exactly symmetrical identical filling is achieved for all cylinders 1, 2, 3, 4, 5, 6, 7, 8. Furthermore, less residual gas will remain in the cylinders 1, 2, 3, 4, 5, 6, 7, 8, which leads to a lower knock tendency of the internal combustion engine. The prolonged opening duration of the charge cycle intake valves or of the camshaft should be particularly stressed, whereby clearly higher power as well as higher torque of the internal combustion engine are achieved. In addition to the increase in power, the fuel consumption in the full-load range is also improved. Another important advantage is achieved at low rotational speeds because very high torques of the internal combustion engine are already obtained at very low rotational speeds. As a result, a "turbo hole"—a weakness of the torque in the lower rotational speed range—can be minimized so that this weakness will no longer occur during the driving operation in practice. Furthermore, an extremely uniform action of the exhaust gas can be achieved upon the turbines, whereby their service life can be extended.

TABLE OF REFERENCE SYMBOLS

1 First cylinder
2 Second cylinder
3 Third cylinder
4 Fourth cylinder
5 Fifth cylinder
6 Sixth cylinder
7 Seventh cylinder
8 Eighth cylinder
9 First cylinder bank
10 Second cylinder bank
11 Exhaust system
11a First exhaust line
11b Second exhaust line
11c Third exhaust line
11d Fourth exhaust line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust system of a 4-stroke 8-cylinder internal combustion engine having a V-design, a first cylinder bank including a first, a second, a third and a fourth cylinder arranged in series side-by-side, and a second cylinder bank situated opposite the first cylinder bank having a fifth, a sixth, a seventh and an eighth cylinder arranged in series side-by-side, wherein the internal combustion engine has an ignition sequence of a 90° crank angle from cylinder to cylinder, the exhaust system comprising:
    a first exhaust gas turbocharger for the internal combustion engine;
    a second exhaust gas turbocharger for the internal combustion engine;
    a first, a second, a third and a fourth exhaust line, each exhaust line extending from two of the cylinders to one of the exhaust gas turbochargers, wherein the first and second exhaust gas turbochargers are assigned two of the exhaust lines;
        wherein of the two cylinders assigned to each exhaust line one cylinder has an ignition interval of a 360 crank angle relative to the other cylinder; and
        wherein the two exhaust lines extending to each exhaust gas turbocharger have a their respective two cylinders' 360° ignition intervals offset from one another by a 180° crank angle.

2. The exhaust system according to claim 1, wherein the two exhaust gas turbochargers and the exhaust system are substantially arranged in the V formed between the first and second cylinder banks of the internal combustion engine.

3. The exhaust system according to claim 2, wherein the first and the second exhaust gas turbochargers are twin-scroll turbochargers.

4. The exhaust system according to claim 3, wherein the exhaust system is a liquid-cooled light-metal exhaust system.

5. The exhaust system according to claim 2, wherein each of the first and the second exhaust gas turbochargers comprise first and second turbine wheels.

6. The exhaust system according to claim 2, wherein the exhaust system is a sheet metal component manufacture.

7. The exhaust system according to claim 2, wherein the exhaust system is a cast component manufacture.

8. The exhaust system according to claim 2, wherein the exhaust system has a composite sheet metal and cast component construction.

9. The exhaust system according to claim 2, wherein the exhaust system is a liquid-cooled light-metal exhaust system.

10. The exhaust system according to claim 1, wherein the first and the second exhaust gas turbochargers are twin-scroll turbochargers.

11. The exhaust system according to claim 1, wherein each of the first and the second exhaust gas turbochargers comprise first and second turbine wheels.

12. The exhaust system according to claim 1, wherein the exhaust system is a sheet metal component manufacture.

13. The exhaust system according to claim 1, wherein the exhaust system is a cast component manufacture.

14. The exhaust system according to claim 1, wherein the exhaust system has a composite sheet metal and cast component construction.

15. The exhaust system according to claim 1, wherein the exhaust system is a liquid-cooled light-metal exhaust system.

16. The exhaust system according to claim 10, wherein the exhaust system is a liquid-cooled light-metal exhaust system.

* * * * *